US008211194B2

(12) United States Patent
Takayanagi

(10) Patent No.: US 8,211,194 B2
(45) Date of Patent: Jul. 3, 2012

(54) DUST REMOVER

(75) Inventor: Makoto Takayanagi, Shizuoka (JP)

(73) Assignee: Trinc.org, Shizuoka (JP)

(*) Notice: Subject to any disclaimer, the term of this patent is extended or adjusted under 35 U.S.C. 154(b) by 267 days.

(21) Appl. No.: 12/563,912

(22) Filed: Sep. 21, 2009

(65) Prior Publication Data

US 2010/0089015 A1 Apr. 15, 2010

(30) Foreign Application Priority Data

Oct. 10, 2008 (JP) ................................. 2008-263325

(51) Int. Cl.
*B01D 50/00* (2006.01)

(52) U.S. Cl. ............. 55/337; 55/345; 55/447; 55/459.1; 15/345; 96/15

(58) Field of Classification Search .................... 55/337, 55/345, 447, 459.1; 96/15; 15/347, 345, 15/353
See application file for complete search history.

(56) References Cited

U.S. PATENT DOCUMENTS 3,052,483 A * 9/1962 Petersen ...................... 180/123

* cited by examiner

*Primary Examiner* — Robert A Hopkins
(74) *Attorney, Agent, or Firm* — Leighton K. Chong

(57) ABSTRACT

A dust remover includes a small container disposed above a work, an aperture provided on the small container. Air is supplied through the aperture to generate high-speed cyclone within the small container. A big container is formed with a suction opening through which dust containing air is sucked out and disposed above the small container to form a flow passage between the small container and the big container. A suction equipment is provided to suck dust containing air through the suction opening of the big container.

29 Claims, 6 Drawing Sheets

DUST REMOVER

TECHNICAL FIELD

This invention relates to a dust remover, and more particularly a dust remover using a mere air, and a dust remover using an ion containing air for removing dust and eliminating electricity simultaneously. In the specification they will be called a dust remover. Furthermore, in order to avoid overlapping description in the specification, the dust remover using a mere air and the dust remover using as an option an ionizer or an ion generator for introducing ions into an air will be explained at the same time. Although an object from which the dust is removed or an object from which the dust is removed and simultaneously electricity is eliminated includes a work, a carpet, a curtain and the like, the object will be called work.

BACKGROUND OF INVENTION

As shown in FIG. 8A, there is one conventional dust remover is moved on the surface of the work 10. The dust 18 on the work 10 is stripped off by a rotating brush 11 and the wind of vacuum suction. As shown in FIG. 8B, there is the other conventional dust remover in which the dust 18 on the work is stripped off by blowing air to the work.

As shown in FIG. 9, there is another conventional dust remover in which an ionizer 12 and a hollow cubic container 14 with its under side being opened for surrounding the dust removing region of the work are disposed. The container 14 is provided at its upper side with suction opening 16. The vacuum suction is made through the suction opening 16 and the dust is sucked out of the container from the work 10 moving in the direction of Y as shown in FIG. 9, using the ion containing air, hereinafter referred to as an ionized air.

Since in one conventional dust remover, as shown in FIG. 8A, the dust is sucked by a high-powered fan to be stripped off, the great electric power is required. Furthermore, since in the other conventional dust remover, as shown in FIG. 8B and FIG. 9, the area of the work which the air or the ionized air is blown to is spot-like, the area of work to be dust removed is small or narrow, and thus the large-area dust removing is difficult. Since air nozzles should be thickly disposed when large-area dust removing is carried out, large number of nozzles is required, the consumption of air becomes large, the running cost becomes high, and at the same time these become the problem as the waste of energy.

Furthermore, since the area of the work which the air or the ionized air is blown to is spot-like, in case that work 10 moves rapidly, the time for removing dust is short and thus the dust is not removed sufficiently. Moreover, since ionized ions is blown to the work at an angle from above, as an arrow X shown in FIG. 8B, the dust 18 would be held down to the work 10, and thus the dust cannot be removed smoothly. Furthermore, in case that the work is a soft film, paper or the like, the work would be flied away since the air or ionized air is blown to the work 10.

Therefore, it is an object of the present invention to provide a dust remover which is capable of removing dust in a large area, is efficient, is capable of reducing the consumptions of air and electric power, and does not contact the surface of the work to cause no damage.

SUMMARY OF INVENTION

To accomplish the object, there is provided a dust remover which comprises a small container disposed above a work, an aperture provided on said small container, through which air is supplied to generate high-speed cyclone within said small container, a big container formed with a suction opening through which dust containing air is sucked out and disposed above the said small container to form a flow passage between said small container and said big container, and a suction equipment or a duct connecting joint, not shown, connected with a vacuum duct, not shown, for sucking dust containing air through said suction opening of said big container.

There is also provided a dust remover which comprises a plurality of dust removing units, each of said dust removing units comprising a small container disposed above the work, an aperture provided on said dust removing unit, through which air is supplied to generate high-speed cyclone within said dust removing unit, a dust sucking container formed with a suction opening through which dust containing air is sucked out, forming a flow passage between said dust removing units and said dust sucking container, and disposed above said dust removing units so as to enclose said dust removing units, and a suction equipment or a duct connecting joint for sucking dust containing air through said suction opening of said dust sucking container.

Other objects, features, and advantages of the present invention will be explained in the following detailed description of the invention having reference to the appended drawings:

BRIEF DESCRIPTION OF DRAWINGS

FIG. 2 is a detailed view for the first embodiment, FIG. 5 is a view showing a second embodiment of dust remover according to the present invention, FIG. 6 is a view for explaining about a third embodiment of dust remover according to the present invention, FIG. 7 is a view for explaining about the comparison of the area to be removed between a conventional dust remover and the present dust remover, FIG. 8 is a view for explaining about two conventional dust removers, FIG. 9 is a view for explaining about another conventional dust remover.

DETAILED DESCRIPTION OF THE INVENTION

First Embodiment

Figure 1:
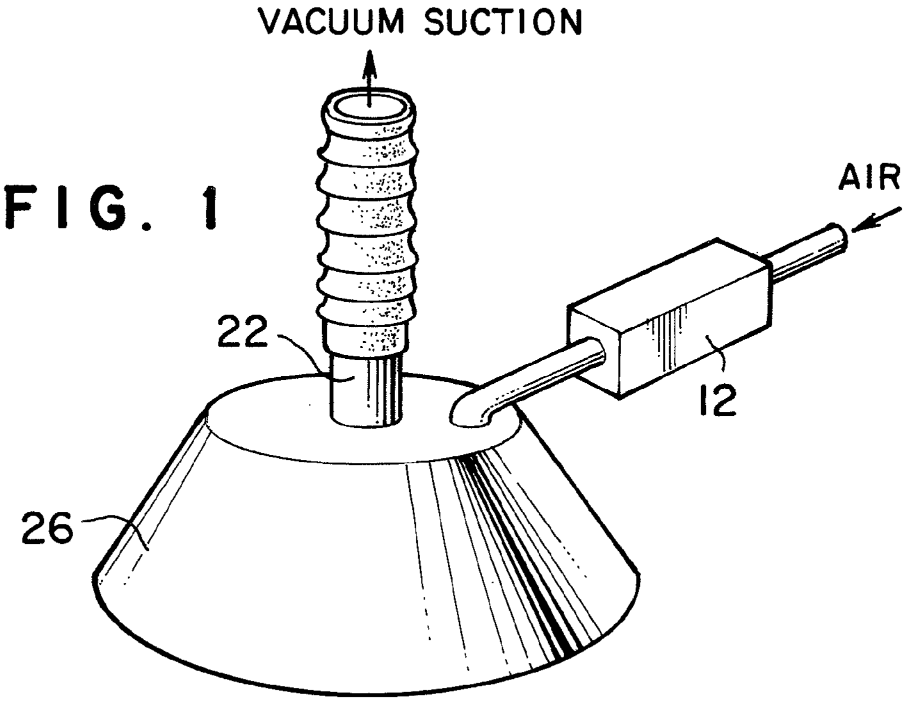
FIG. 1 is a perspective view showing a first embodiment of dust remover according to the present invention.

As shown in FIG. 1, in the first embodiment of dust remover according to the present invention, air is supplied into an internal container, not shown, disposed within a container 26 or air is supplied to ions generated by an ionizer 12 which may be provided as an option to produce ionized air, and then ionized air thus obtained is supplied into the internal container, not shown, disposed within the container 26. By supplying air or ionized air into the internal container, cyclone of air or ionized air is generated within the internal container. In case of ionized air, the work and dust on the work are electrostatically eliminated to get rid of attraction power between the dust and the work and at the same time the dust on the work is pushed outward from the peripheral portion of the internal container. The dust thus pushed is sucked through flow passage, not shown, between the container 26 and the internal container, and through a suction opening 22. As a result the dust is removed from the surface of the work. Furthermore, in case of using ionized air, not a mere air, since the dust and the work are electrostatically eliminated to get rid of attraction acting between the dust and the work, the better dust removing is obtained.

Figure 2A:
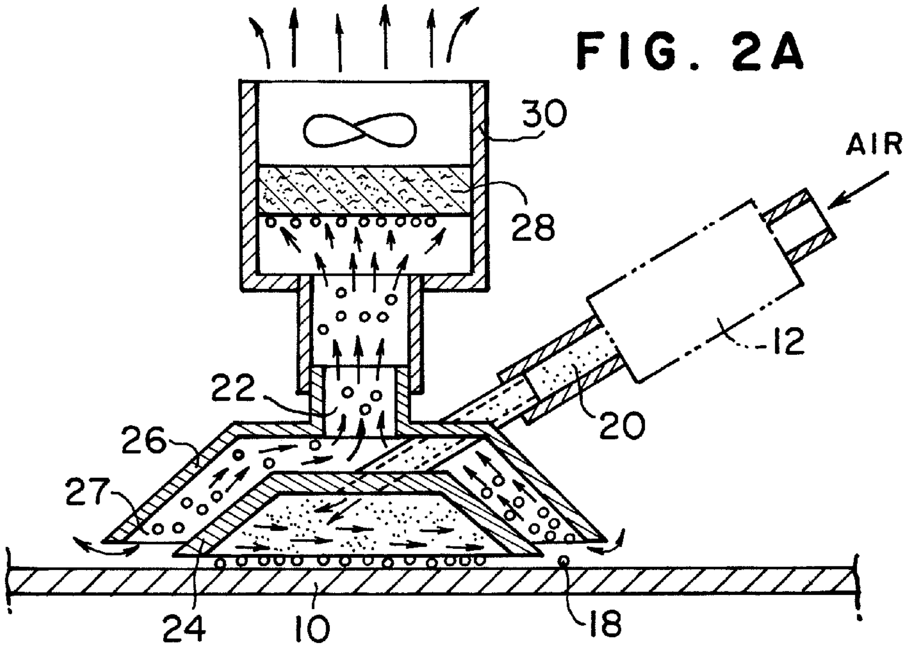
FIG. 2A is a cross-sectional view along the lines of A-A in FIG. 2B.
Figure 2B:
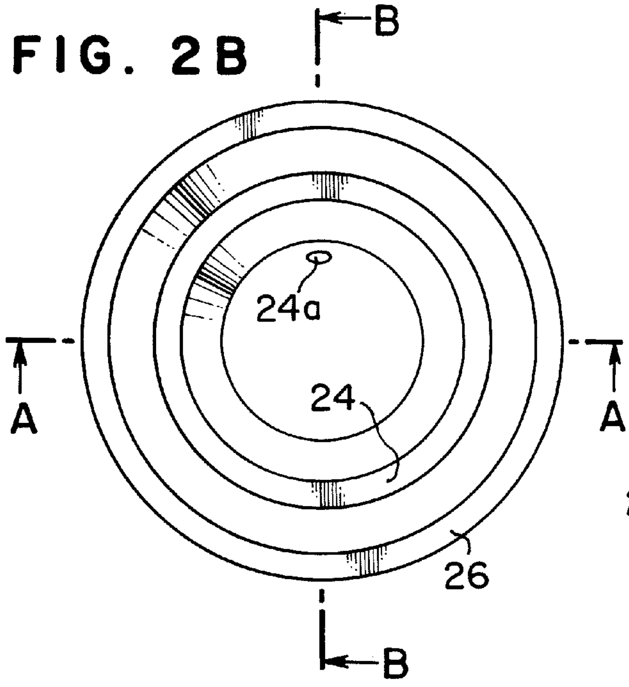
FIG. 2B is a bottom view.
Figure 2C:
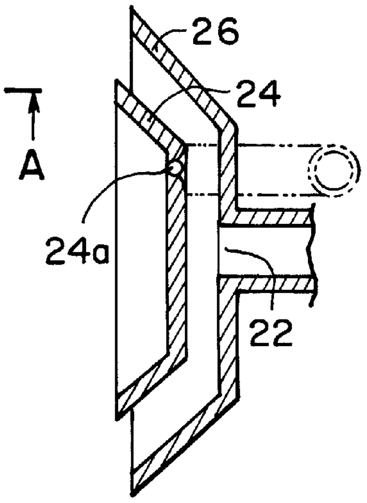
FIG. 2C is a cross-sectional view along the lines of B-B in FIG. 2B.

Now referring to FIG. 2, the detailed explanation of dust remover which has been explained with reference to FIG. 1 will be made. As shown in FIG. 2, the dust remover includes an ionizer 12 and an internal smaller container 24 which ionized air 20 generated by the ionizer 12 is supplied into. The smaller container, hereinafter referred to as small container, is of a hollow truncated-conic dish shape. The dish shape may be of a hollow cylindrical one instead of hollow conic shape. The small container is formed with a through aperture or blowoff portion 24*a* for supplying air or ionized air into the small container 24. This aperture 24*a* is formed to be of small diameter so that speeding up of air or ionized air is obtained. Any shape of hollow dish-like bigger container 26, hereinafter referred to as big container, which is bigger than the small container 24, is disposed above the small container 24 so that the flow passage 27 is formed between the big container 26 and the small container 24. The big container 26 is formed with a suction opening 22 at its central upper portion, and the dust-containing air is sucked through the suction opening 22 by a suction equipment or portion 30. A dust filtering device 28 is disposed within the suction portion 30 to get rid of the dust contained in the sucked air and discharge a clean air outside. Furthermore, the distance between the work 10 and the bottom portion of big container 26 is made to be bigger than the distance between the work 10 and the bottom portion of the small container 24. Moreover, although the dust remover acts in non-contact state, in view of strong force applied from outside, it is preferable that any means of separating the dust remover from the surface of the work, such as means of suspending the whole dust remover above the work is provided.

Figure 3:
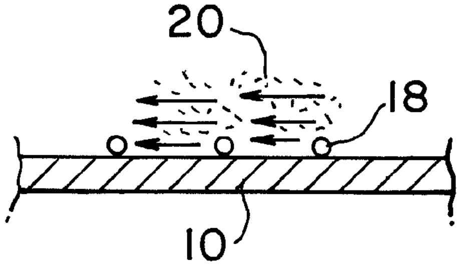
FIG. 3 is a view for explaining about the function of removing the dust from the work and moving the dust outward.

As shown in FIG. 3, the dust 18 near the periphery of surface of work 10 is removed by the air, and in case of ionized air the dust is electrostatically eliminated and at the same time receives thrust force, or force in a lateral direction, that is, in a parallel direction to the work, not force at an angle from above as in the conventional dust remover. As a result, the dust 18 is smoothly stripped off from the work 10 and then is pushed outside of the small container 24.

Figure 4:
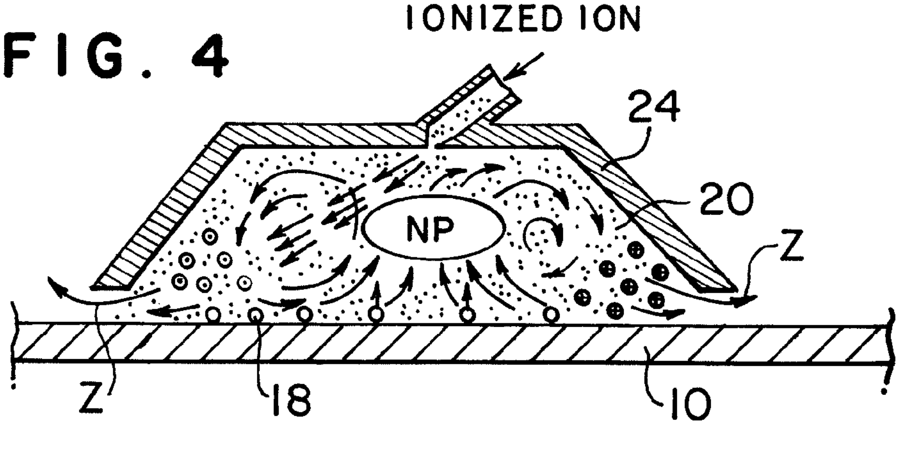
FIG. 4 is a view for explaining about the function obtained from generation of cyclone within a small container.

Together with the above-mentioned function, as shown in FIG. 4, negative pressure NP is generated approximately in the central portion of small container 24 by introduction of air into the small container 24. Furthermore, generation of negative pressure is made by construction that the amount of air or ionized air blown out through the gap between the peripheral bottom portion of the container 24 and the work is a little bit more than the amount supplied with air or ionized air into the small container 24. The negative pressure NP causes air to rise from the work 10. In the embodiment, on the left side of the negative pressure, rising air in a counter clockwise direction is generated and on the right side of negative pressure rising air in a clockwise direction is generated. The dust on the surface of work 18 is picked up by the rising air thus generated, and in case of ionized air the dust on the surface of work 18 is electrostatically eliminated and picked up by the rising air thus generated. By centrifugal force due to cyclone, the dust is pushed out from the peripheral portion of the small container 24 as shown by arrow Z. That is, the dust attached to the work 10 is stripped off by high-speed rotational wind of cyclone. Since the high-speed rotational wind of cyclone generates high-speed airflow at the peripheral portion of the small container, the high-speed wind blows in large area. As a result, the dust can be removed by a few air. Furthermore, due to large-area dust removal, enough time for dust removal can be taken for the work of high-speed movement and the dust removal can follow the high-speed movement of the work. When the cyclone arises, high-speed wind is blown to the peripheral portion of the small container and then blown outside through the narrow gap between the bottom of the container and the work. At that time, when the amount of blown-outside air is more than the amount of supplied air, the negative pressure is generated at the central portion of the small container. Since the small container is of a dish-like shape and its diameter is enlarged or equal from upper portion to bottom portion, that is, as its peripheral portion is near the bottom, air and dust is blown to the peripheral portion of the small container by centrifugal force due to high-speed rotation, and then below the bottom portion density of air and density of dust become highest. As a result the dust attached on the work receives thrust force by rotating high-density air and high-density dust, which can enhance efficiency of dust removal.

At that time, since when the negative pressure used for the big container 26 to suck through the sucking opening is too strong, the work is attracted and contacted with the small container 24, the bottom of the big container is made to be opened more widely than the bottom of the small container in order to suck the air from outside at full-time and the negative pressure is maintained not to rise above a certain level, and thereby non-contact is maintained. In the present dust remover, balance is automatically maintained so that the small container does not approach the work within a certain distance and does not leave the work beyond a certain distance. By this function, non-contact between the small container and the work is maintained, and the work does not receive contamination and damages.

Second Embodiment

Figure 5A:
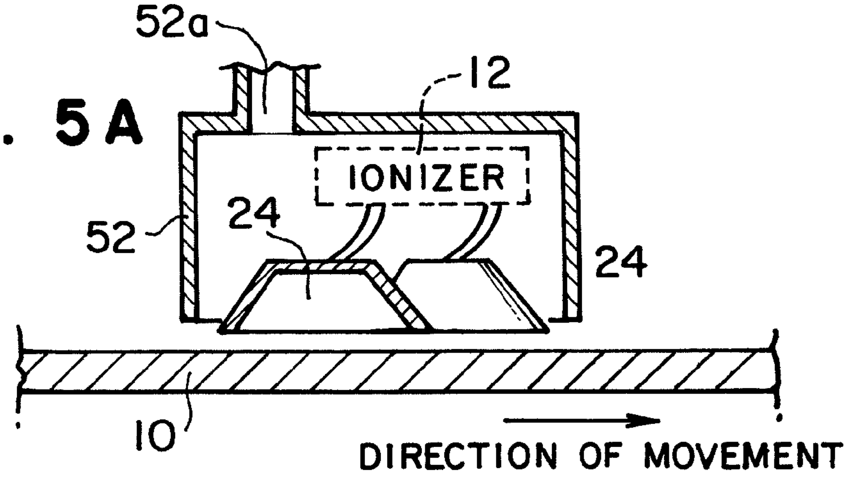
FIG. 5A is a cross-sectional view along the lines of A-A in FIG. 5B.
Figure 5B:
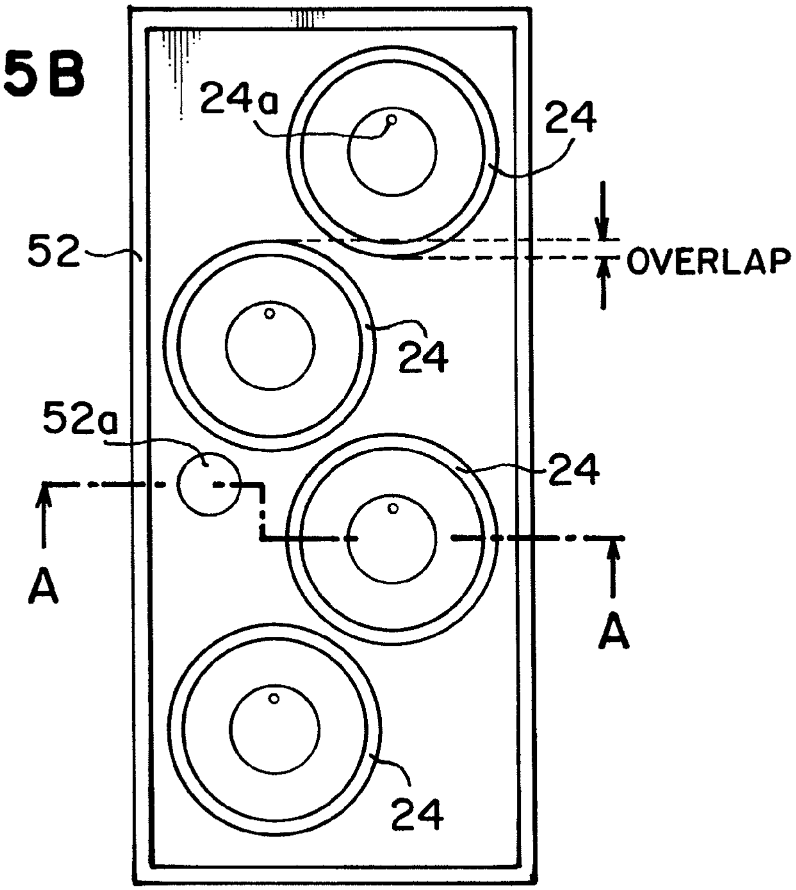
FIG. 5B is a bottom view.

As shown in FIG. 5, in the second embodiment the ionizer 12 as an option, a plurality of dust removing units and dust sucking container are used. Each of dust removing units corresponds to the small container 24 as explained with reference to FIGS. 2 and 4. Each small container 24 is supplied with ionized air from one or plural ionizer 12 and the cyclone is generated within the small container and thus dust on the surface of the work is pushed to the peripheral portion of the small container. In the second embodiment, Instead of the big container 26 used together with each small container, a single dust sucking container 52 in the form of hollow cubic shape is used. The dust which is pushed out from the small containers is sucked through the aperture 52*a*.

A plurality of dust removing units are disposed so that they cover the whole surface area of the work in the direction of movement of work. For example, the dust removing units are disposed in a zigzag manner in the direction perpendicular to the direction of movement of work and thus the bottoms of small containers are overlapped in the direction of movement.

Third Embodiment

Figure 6A:
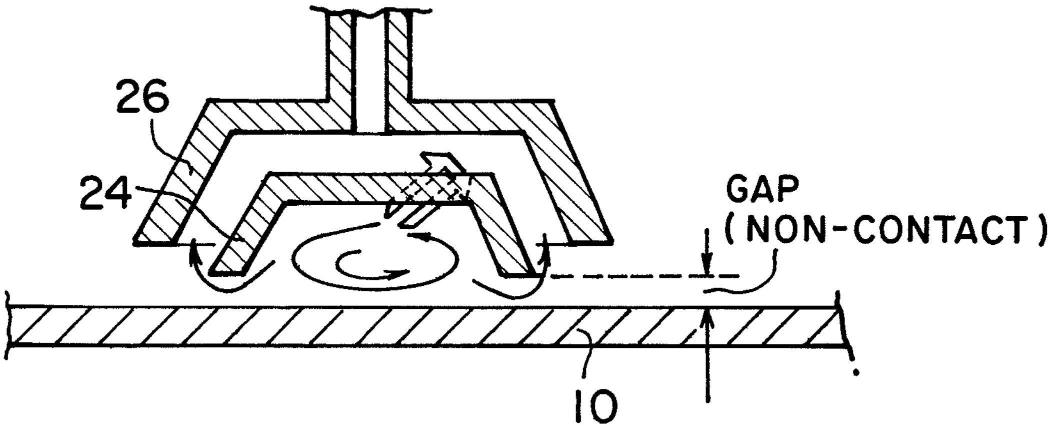
FIG. 6A is a cross-sectional view at the center of the container.
Figure 6B:
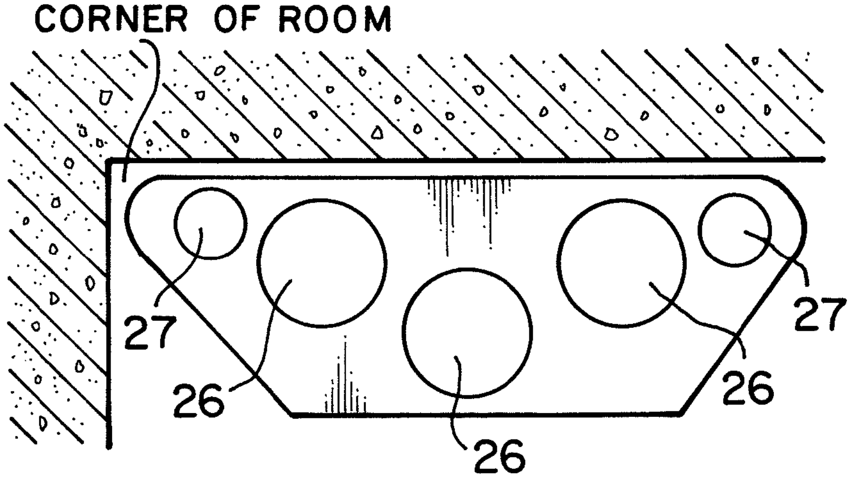
FIG. 6B is a bottom view.

As shown in FIG. 6, a plurality of dust removers or dust removing units, hereinafter referred to as a dust removing assembly, are disposed above the work such as carpet in non-contact state so as to be operated. Non-contact operation can avoid the problems such as interruption of suction or interruption of movement of the work or the like that would occur when operation is made in contact state. In the embodiment, the dust removing assembly is moved in non-contact with the work. In case of dust remover, small container 24 and big container 26 are provided, and in case of dust removing unit, small container 24 is provided. Furthermore, when the work is picked up or stripped off, by raising amount of air above the dust removing operation the cyclone is caused to destroy. Although the conventional usual cleaner varies suction power to change the dust removing amount, in the present dust removing assembly the dust removing amount is controlled by changing air output when air is supplied so as to vary the strength of cyclone. Containers 27 diameter of which is smaller than those of containers 24 or 26 are disposed at the corner within the enclosure for enclosing and holding the containers. As a result, for example, the dust on the carpet at the corner of the room can be removed.

Figure 7A:
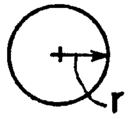
FIG. 7A PRIOR ART
FIG. 7A is concerned about the conventional dust remover.
Figure 7B:
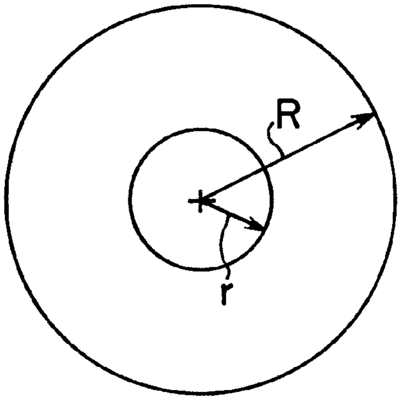
FIG. 7B is concerned about the present dust remover.
Figure 8A:
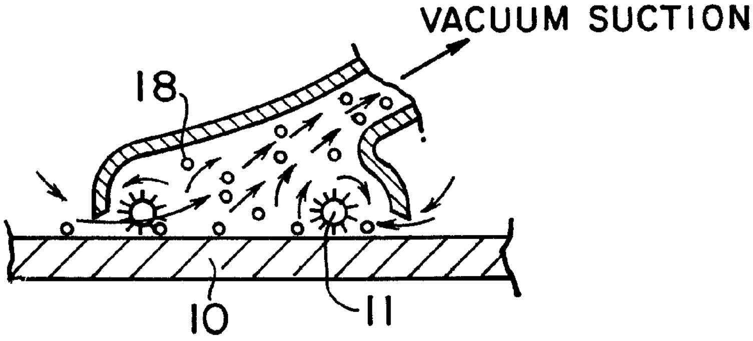
FIG. 8A PRIOR ART
FIG. 8A shows one conventional dust remover.
Figure 8B:
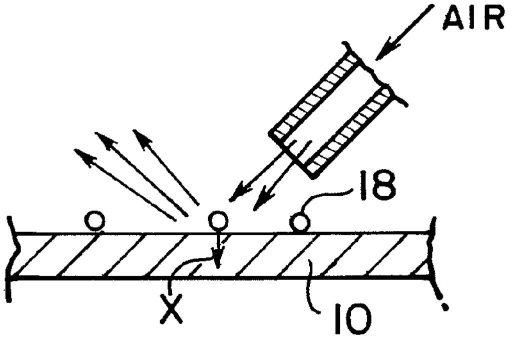
FIG. 8B PRIOR ART
FIG. 8B shows the other conventional dust remover.
Figure 9A:
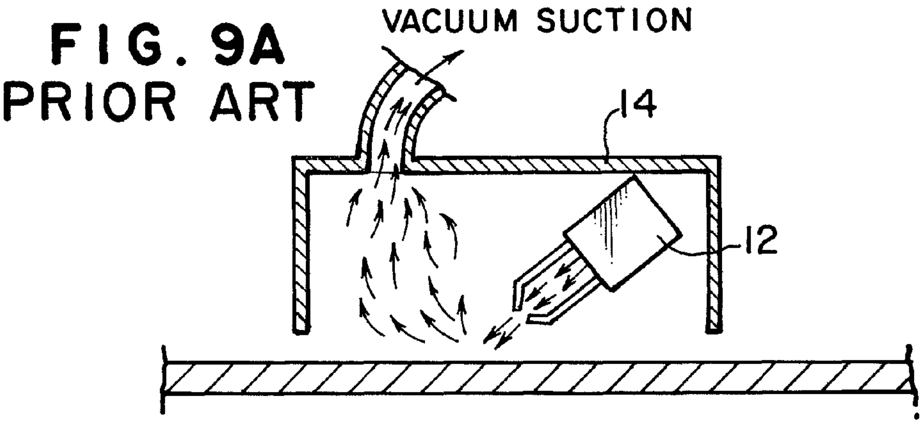
FIG. 9A PRIOR ART
FIG. 9A is a cross-sectional view along the lines of A-A in FIG. 9B
Figure 9B:
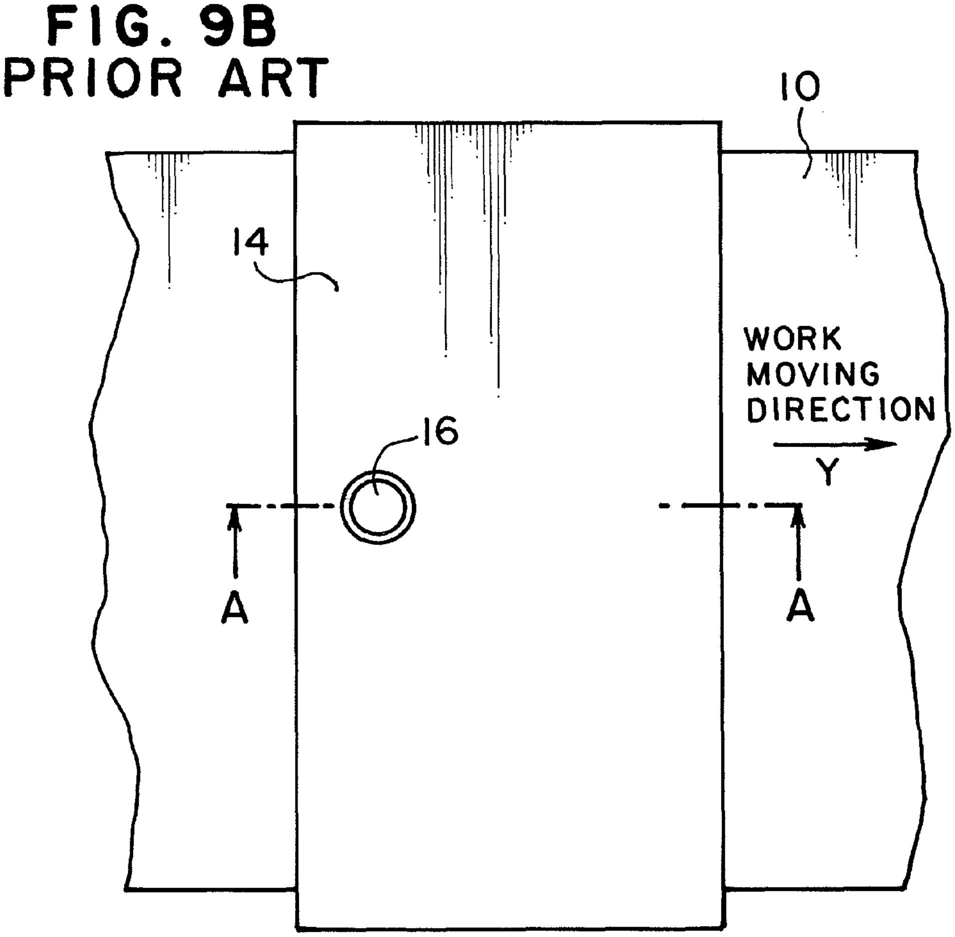
FIG. 9B PRIOR ART
FIG. 9B is a plan view.

FIG. 7 is a view for explaining about the comparison of the area to be removed between a conventional dust remover and the present dust remover. In the spot type of the conventional dust remover as shown in FIG. 7A, assuming that r is 10 mm, the area which covers becomes 100π. Meanwhile, in the present dust remover as shown in FIG. 7B, assuming that r is 15 mm and R is 50 mm, the area which covers becomes $\pi(R^2-r^2)=2275\pi$. As a result, the present dust remover covers the area 22 times as greater than that of the conventional one for the same amount of air.

It is understood that many modifications and variations may be devised given the above description of the principles of the invention. It is intended that all such modifications and variations be considered as within the spirit and scope of this invention, as it is defined in the following claims.

The invention claimed is:

1. A dust remover comprising:
- a small container disposed above a work,
- an aperture provided in said small container, through which air is supplied to generate a high-speed cyclone within said small container,
- a big container formed with a suction opening through which dust containing air is sucked out and disposed above said small container to form a flow passage between said small container and said big container, and
- a suction equipment or a duct connecting joint for sucking dust containing air through said suction opening of said big container,
- in which the air supplied within said small container is made to include ions.

2. A dust remover according to claim 1 in which said small container is of a hollow truncated-conic dish shape and said big container is of any hollow dish shape.

3. A dust remover according to claim 1 in which the diameters of said small container and said big container are enlarged as their portions is near the work.

4. A dust remover according to claim 1 in which said cyclone generates negative pressure within said small container, and the amount of air blown outside through a gap between the bottom of said small container and the work is caused to be more than the amount of air supplied into said small container so as to generate said negative pressure.

5. A dust remover comprising:
- a small container disposed above a work,
- an aperture provided in said small container, through which air is supplied to generate a high-speed cyclone within said small container,
- a big container formed with a suction opening through which dust containing air is sucked out and disposed above the said small container to form a flow passage between said small container and said big container, and
- a suction equipment or a duct connecting joint for sucking dust containing air through said suction opening of said big container,
- in which the air supplied into said small container is in the a tangential direction of said cyclone.

6. A dust remover according to claim 5 in which the air supplied into said small container is also orientated to the work.

7. A dust remover according to claim 5 in which said aperture through which air is supplied into said small container is formed to be of a small diameter so as to speed up the air.

8. A dust remover according to claim 5 in which said suction equipment is provided with a dust filtering device.

9. A dust remover according to claim 5 in which the distance between said big container and the work is larger than the distance between said small container and the work.

10. A dust remover according to claim 5 in which the dust remover is made not to be contacted with the work, or is operated in non-contact state to remove dust.

11. A dust remover according to claim 5 in which the strength of said cyclone is changeable by changing the amounts of air supplied into and blown out of said dust removing unit.

12. A dust remover according to claim 5 in which said cyclone is designed to strip the work off by raising the amount of air above the dust removing operation.

13. A dust remover according to claim 5 in which said small container is of a hollow truncated-conic dish shape and said big container is of any hollow dish shape.

14. A dust remover according to claim 5 in which the diameters of said small container and said big container are the same from top to bottom.

15. A dust remover according to claim 5 in which the diameters of said small container and said big container are enlarged as their portions is near the work.

16. A dust remover according to claim 5 in which said cyclone generates negative pressure within said small container, and the amount of air blown outside through a gap between the bottom of said small container and the work is caused to be more than the amount of air supplied into said small container so as to generate said negative pressure.

17. A dust remover comprising:
- a plurality of dust removing units, each of said dust removing units comprising a small container disposed above the work,
- an aperture provided in said dust removing unit, through which air is supplied to generate a high-speed cyclone within said dust removing unit,
- a dust sucking container formed with a suction opening through which dust containing air is sucked out, forming a flow passage between said dust removing units and said dust sucking container, and disposed above said dust removing units so as to enclose said dust removing units, and
- a suction equipment sucking dust containing air through said suction opening of said dust sucking container,
- in which the air supplied within said small container is made to include ions.

18. A dust remover according to claim 17 in which said plurality of dust removing units are disposed perpendicular to the direction of movement of the work and the bottom portions of dust removing units are disposed so as to be overlapped.

19. A dust remover according to claim 17 in which said dust removing unit is of a hollow truncated-conic dish shape or hollow cylindrical dish shape.

20. A dust remover according to claim 17 in which the diameter of said dust removing unit is enlarged as its portion is near the work.

21. A dust remover according to claim 17 in which said cyclone generates negative pressure within said dust removing unit, and the amount of air blown outside through a gap between the bottom of said dust removing unit and the work is caused to be more than the amount of air supplied into said small container so as to generate said negative pressure.

22. A dust remover according to claim 17 in which the air supplied into said dust removing unit is in a tangential direction of said cyclone.

23. A dust remover according to claim 17 in which the air supplied into said dust removing unit is also orientated to the work.

24. A dust remover according to claim 17 in which said aperture through which air is supplied into said small container is formed to be of a small diameter so as to speed up the air.

25. A dust remover according to claim 17 in which said suction equipment is provided with a dust filtering device.

26. A dust remover according to claim 17 in which the dust remover is made not to be contacted with the work, or is operated in non-contact state to remove dust.

27. A dust remover according to claim 17 in which the strength of said cyclone is changeable by changing the amounts of air supplied into and blown out of said dust removing unit.

28. A dust remover according to claim 17 in which said cyclone is designed to strip the work by raising the amount of air above the dust removing operation.

29. A dust remover according to claim 17 in which the diameter of the container or containers disposed within said dust sucking container at the corner thereof is smaller than that of the other containers.

* * * * *